United States Patent
Adams et al.

(10) Patent No.: US 9,221,981 B2
(45) Date of Patent: Dec. 29, 2015

(54) HAND SANDABLE FAST REPAIR BODY FILLER/PUTTY/PRIMER SURFACER

(75) Inventors: Robert Mark Adams, Cincinatti, OH (US); Randall Lake, Independence, KY (US); Michael R. Schallick, Lawrenceburg, IN (US)

(73) Assignee: Illinois Tool Works Inc., Glenview, IL (US)

( * ) Notice: Subject to any disclaimer, the term of this patent is extended or adjusted under 35 U.S.C. 154(b) by 103 days.

(21) Appl. No.: 13/454,639

(22) Filed: Apr. 24, 2012

(65) Prior Publication Data

US 2013/0004663 A1 Jan. 3, 2013

Related U.S. Application Data

(60) Provisional application No. 61/502,896, filed on Jun. 30, 2011.

(51) Int. Cl.
*C09D 5/34* (2006.01)
*C09D 167/08* (2006.01)
*C08L 67/08* (2006.01)

(52) U.S. Cl.
CPC . *C09D 5/34* (2013.01); *C08L 67/08* (2013.01); *C09D 167/08* (2013.01); *C08L 2205/18* (2013.01)

(58) Field of Classification Search
CPC .................................. C09D 5/34; C09D 167/08
USPC ............. 524/425, 451; 427/140, 142; 525/451
IPC ............................................. C09D 5/34, 167/08
See application file for complete search history.

(56) References Cited

U.S. PATENT DOCUMENTS

| | | | |
|---|---|---|---|
| 2,482,825 A | 9/1949 | Amos et al. | |
| 3,228,787 A | 1/1966 | Haubert | |
| 3,839,248 A | 10/1974 | Clark et al. | |
| 4,304,883 A * | 12/1981 | Fujii et al. | 525/170 |
| 5,420,205 A * | 5/1995 | Becker et al. | 525/168 |
| 7,550,532 B2 * | 6/2009 | Reynolds | 525/27 |

FOREIGN PATENT DOCUMENTS

| | | | |
|---|---|---|---|
| FR | 711 827 A | | 9/1931 |
| GB | 1 274 764 A | | 5/1972 |
| GB | 1354436 A | * | 6/1974 |
| JP | 05262867 A | * | 10/1993 |
| WO | WO 9519379 A1 | * | 7/1995 |

OTHER PUBLICATIONS

Machine translated English equivalent of JP 05-262867 (Oct. 1993, 11 pages).*
Specialty Minerals (Talcs for Adhesives & Sealants, 2008, 3 pages).*
Body Filler (Talcs for Polyester, Specialty Minerals, 2002, 1 page).*
USC MSDS (Feather-Rite Tack-Free, MSDS, 2003, 4 pages).*
USC TDS (Feather-Rite Tack-Free, TDS, Feb. 2011, 2 pages).*
USC Catalog (Body Filler, Putties, Clears, Primers and Accessories Selected from USC's Full Line Catalog, Alco Industries, 2004, 6 pages).*
International Search Report and Written Opinion of the International Searching Authority pertaining to international Application No. PCT/US2012/043978, mailed Sep. 13, 2012.
Official Action issued by the Canadian Patent Office for corresponding CA Application No. 2,840,259, mailed Jan. 30, 2015.
Canadian Patent Office, Office Action, dated Oct. 26, 2015.

* cited by examiner

*Primary Examiner* — Brieann R Fink
(74) *Attorney, Agent, or Firm* — Greer, Burns & Crain, Ltd.

(57) ABSTRACT

A body filler resin composition for a two-part resin system is described. In one embodiment, the body filler resin composition includes a polymer having fatty acid functionality, and at least one filler. A two-part resin system and a method of repairing a part using the body filler composition are also described.

14 Claims, No Drawings

HAND SANDABLE FAST REPAIR BODY FILLER/PUTTY/PRIMER SURFACER

This application claims priority under 35 U.S.C. §119 from provisional application Ser. No. 61/502,896, which was filed on Jun. 30, 2011.

The invention relates generally to unsaturated polyester resins and their use in primer surfacers, body fillers, and putties that are used in repairs and surface finishing for metal, composite, concrete, and plastic substrates for architectural uses, construction, industrial equipment, wind energy and vehicles such as automotive, marine, agricultural, and airborne.

BACKGROUND OF THE INVENTION

Traditionally, the polyester repair markets have utilized well-defined processes in the area of damage repair. Unsaturated polyester resins are used in primer surfacers, body fillers, or putties to resurface and reshape damaged areas. For ease of understanding, the term "body fillers" will be used in the following description; however, it is to be understood that the term includes, primer surfacers, body fillers, and body putties.

Unsaturated polyester resins (UPR) have dominated the chemical backbone of body fillers since the late 1950's, and they have changed little over the past 50 years. Improvements have been made by using premium unsaturated polyester resins which have unique UV resistance and air dry qualities, making them ideal for premium grade fillers. However, the premium resins are expensive, and the resulting physical properties are less than ideal, especially in the area of impact strength and adhesion to metal substrates. In order to improve the physical properties, the premium resins have been blended with lower cost, more flexible, tougher unsaturated polyester resins. However, the trade-off for the improved properties is reduced sandability. The more "flexibility" is built into the filler by way of altering the resin composition, the worse the sanding becomes. A surfacing agent is frequently included in the filler composition to overcome this deficiency.

SUMMARY OF THE INVENTION

One aspect of the invention is a body filler resin composition for a two-part resin system. In one embodiment, the body filler resin composition consists essentially of a polymer having fatty acid functionality; an optional unsaturated polyester resin, vinyl ester resin, dicyclopentadiene resin, or combinations thereof; an optional reactive monomer, reactive oligomer, reactive bio-derived oil, or combinations thereof; an optional additive, and at least one filler.

Another aspect of the invention is a two-part resin system. In one embodiment, the two-part resin system includes a body filler resin composition consisting essentially of a polymer having fatty acid functionality; an optional unsaturated polyester resin, vinyl ester resin, dicyclopentadiene resin, or combinations thereof; an optional reactive monomer, reactive oligomer, reactive bio-derived oils, or combinations thereof; an optional additive; and at least one filler; and a hardener composition including a carrier; and a catalyst.

Another aspect of the invention is a method of repairing a part. In one embodiment, the method includes providing a body filler resin composition consisting essentially of a polymer having fatty acid functionality; an optional unsaturated polyester resin, vinyl ester resin, dicyclopentadiene resin, or combinations thereof; an optional reactive monomer, reactive oligomer, reactive bio-derived oils, or combinations thereof; an optional additive; and at least one filler; providing a hardener composition including a carrier; and a catalyst; mixing the body filler resin composition and the hardener composition to form a mixed composition; applying the mixed composition to the part; and hand sanding the part when the mixed composition is dry to touch.

DETAILED DESCRIPTION OF THE INVENTION

This invention describes a formulated body filler composition with a unique secondary oxidative cure mechanism that allows for acceptable repairs without the need for traditional sanding equipment. In some embodiments, it can be made using sustainable raw materials. It can be made using a two-part resin system.

The present invention involves a polyester primer surfacer, body filler, or putty that can be applied to metal substrates, such as cold rolled steel, galvanized steel, and aluminum, as well as to plastic substrates, such as polyesters, polyurethanes, polyolefins, sheet molding compounds (SMC), and bulk molding compounds (BMC). Its primary usage will be automotive, industrial, recreation vehicle, wind energy, aeronautical, and marine repair. It is particularly useful for the restoration of damaged automotive body sections to their original appearance and durability. Automotive bonding putties are known as "body fillers" (for deeper repairs) or "body putties" (for less indented or surface repairs).

Body fillers based on unsaturated polyester having fatty acid functionality are cured primarily by way of addition polymerization with a peroxide catalyst and a reactive monomer or oligomer, and secondarily by an oxidative mechanism whereby atmospheric oxygen reacts with the fatty acid double bonds attached to the polymer backbone. This dual curing mechanism allows for a very fast dry to touch quality. Instead of the reactive monomers cross-linking at approximately 97% efficiency for standard unsaturated polyester resin, the polyester with the fatty acid functionality allows for nearly 100% cross-linking. To the end-user, this translates into improved sandability. This invention further demonstrates that the hand sandability can be further enhanced to match the speed and quality of a pneumatically sanded standard industry body filler.

In general, this curing mechanism will work with any polymer with fatty acid functionality, such as alkyds resins and vegetable oil-based polyesters, such as soy-based polyesters. One example of a suitable soy-base polymer is a soy derived UPR, such as Reichhold 32-360-00.

Further, the present invention has the additional benefit of a more highly branched polymer matrix when cured. This provides for improved solvent resistance (from primers, sealers, or top coats). This improvement helps reduce the likelihood of "blushing" from occurring, that is, the bleaching out of dark-colored top coats due to solvent absorption into the underlying repair materials.

Most body filler materials require the use of pneumatic high speed sanding equipment with coarse and very hard abrasives (such as 80 grit zinc-oxide coated sandpaper). While this invention improves the speed of sanding with pneumatic high speed sanding equipment, this equipment is not always available, particularly in developing markets. In contrast, fillers produced with the polymer having fatty acid functionality can be shaped or abraded by hand with much softer materials using sanding sponges and pads. This makes fast, high quality repairs more accessible to small businesses, and do-it-yourself individuals, and lowers the cost to the repair facility.

The polyester resin having fatty acid functionality can be used in standard body filler formulations to replace as little as 3-5 wt % (or more up to all of the resin) of the standard unsaturated polyester resin, and the formulation with polyester resin having fatty acid functionality will have improved sandability compared with the standard formulation without the polyester resin having fatty acid functionality.

The resin side of the body filler can optionally include an unsaturated polyester resin, dicyclopentadiene resins (DCPD), and/or vinyl ester resins, if desired. Suitable unsaturated polyester resins include, but are not limited to condensation polymers formed by the reaction of polyols (also known as polyhydric alcohols), organic compounds with multiple alcohol or hydroxy functional groups, with saturated or unsaturated dibasic acids. Typical polyols used are glycols such as ethylene glycol, diethylene glycol, propylene glycol, neopentyl glycol, methyl propane diol, and triethylene glycol; acids used may be phthalic acid, maleic acid, fumaric, isophthalic, nadic, adipic, CHDA, and polyethylene terephthalate.

The resin side of the body filler includes a reactive monomer, reactive oligomers, and/or reactive bio-derived oils. Suitable monomers include, but are not limited to, styrene, vinyl toluene, other methylated styrene monomers, methyl methacrylate, and other acrylate monomers. The reactive oligomers are generally polymers of two, three, or four monomer building blocks, or difunctional, trifunctional, or tetrafunctional polymers derived from the monomers. Reactive bio-derived oils include, but are not limited to, Acrylated Epoxidized oils (AESO, AELO), Maleinated Acrylated Epoxidized oils (MAESO, MAELO), and multi-functionalized acrylate compounds.

The resin side can also include one or more additives/processing aids, such as promoters, rheological modifiers, pigment wetting and dispersing agents, antioxidants, inhibitors, paraffins, and pigments.

Fillers, such as talcs, carbonates, microspheres (glass, ceramic, or plastic), and fiber reinforcements are included. The choice of the type and size of the fillers controls the rheological properties of the finished product, such as sandability, spreadability, leveling, sag resistance, and storage stability.

A typical formulation is shown in Table 1.

TABLE 1

| Material | Range Wt % | Range Wt % |
|---|---|---|
| Unsaturated polymer having fatty acid functionality | 3-60 | 35-45 |
| Unsaturated Polyester Resin/ Vinyl ester resin/DCPD | 0-57 | 0-10 |
| Reactive Monomer/Reactive oligomers/ Reactive bio-derived oils | 0-30 | 2-8 |
| Additives | 0.1-6 | 1-2 |
| Talc A (1-8 micron) (Filler) | 2-10 | 4-6 |
| Talc B (10-20 micron) (Filler) | 20-50 | 35-45 |
| Calcium Carbonate (2-10 micron) (Filler) | 2-10 | 5-7 |
| Microspheres (d = 0.12-0.60 g/cc) (Filler) | 2-8 | 3-4 |
| Other Fillers | 0-10 | 0-3 |

The hardener side typically includes a catalyst, a carrier, plasticizer, and stabilizers. Typical catalysts include a broad range of peroxide catalysts. Suitable peroxide catalysts include, but are not limited to, ketone peroxides, cumyl hydroperoxides, dibenzoyl peroxides, peroxyesters, peroxyketals, and peroxydicarbonates, and any diluted forms of each. Suitable ketone peroxides include, but are not limited to, methyl ethyl ketone peroxide, 2,4-pentadione peroxide, methyl isobutyl ketone peroxide, acetyl acetone peroxide, cyclohexanone peroxide.

The ratio of the resin side to the hardener side is generally in a range of about 100:1 to about 30:1, and is typically about 50:1. However, the peroxide concentration in the hardener side can be varied so that the volume of the hardener and resin compositions are approximately the same, for example, as described in U.S. Pat. Nos. 7,550,532, 7,683,116, 7,723,416, and 7,781,514, which are incorporated herein by reference. When this is done, the ratio of the volume of the resin side to the volume of the hardener side is generally about 10:1 to about 1:1, typically about 10:1 to about 2:1. With the volume ratio in this range, it is much easier to provide the correct amount of hardener for the amount of resin used, eliminating the guesswork of prior art systems.

In order that the invention may be more readily understood, reference is made to the following examples which are intended to illustrate the invention, but not limit the scope thereof.

Example 1

Manual Sanding Test

Resin side compositions were made using the soy resin according to the formulations in Table 2.

TABLE 2

| Material | Soy 1 Wt % | Soy 2 Wt % |
|---|---|---|
| Soy oil derived UPR | 44.72 | 36.32 |
| Styrene Monomer | 3 | 6 |
| Promoter | 0.21 | 0.11 |
| Antioxidants | 0.023 | 0.034 |
| Additives/Processing Aids | 1.3 | 1.3 |
| Talc A (1-8 micron) (Filler) | 5.06 | 4.46 |
| Talc B (10-20 micron) (Filler) | 35.6 | 42.59 |
| Calcium Carbonate (2-10 micron) (Filler) | 6.58 | 5.68 |
| Glass microspheres (d = 0.12-0.60 g/cc) | 3.51 | 3.51 |
| Totals | 100.003 | 100.004 |

100 g of each filler sample was catalyzed with benzoyl peroxide (BPO) (2 g of 50% or 10 g of 10% paste), mixed by hand for 1 minute, and then applied to an un-sanded steel panel using a plastic spreader. Material was applied at a thickness of approximately 50 mils with the edges tapered to the substrate, and it was allowed to cure at room temperature. (70-75 F). Sandability was tested, and the results are shown in Table 3.

TABLE 3

| Materials | Scotch Brite | | Foam Block | | 3M 80 Grit Sandpaper | | |
|---|---|---|---|---|---|---|---|
| | Hand Performance (rated 1-10 with 10 as best) | Sand Window from catalyzation | Hand Performance (rated 1-10 with 10 best) | Sand Window from catalyzation | Hand Performance (rated 1-10 with 10 best) | Pneumatic Performance (rated 1-10 with 10 best) | Window from catalyzation |
| Soy 1 Sample | 5 | 11-12 minutes | 5 | Sandable after 14:00 | 7 | 9 | Sandable after 14:00 |
| Soy 2 Sample | 8 | 10-14 minutes | 7 | Sandable after 18:00 | 9 | 9 | Sandable after 18:00 |
| Lightweight traditional polyester body filler | 2 | 10-11 minutes | 3 | Sandable after 16 | 6 | 9 | Sandable after 16:00 |

The results above suggest that the soy 2 sample could be sanded using materials other than traditional sand paper. The hand sanding of the soy 2 sample appears to be similar to the performance of pneumatically sanded standard polyester body filler.

The lightweight traditional polyester body filler was too hard for a sanding sponge or pad to abrade the material with manual effort only.

Example 2

The material was catalyzed at either 2% (50% BPO paste) or 10% (10% BPO paste) and mixed for one minute. The samples were placed into 1" diameter molds. The curing material was removed from the molds after 15 minutes. Both sides of each casting were sanded on the sanding machine for 30 seconds. The height and weight of each casting was measured. At 20 minutes, the samples were placed into a Struers Rotopol 11 sanding machine and abraded with 5N force for 4 minutes. The height and weight of each specimen were re-measured, and the loss as a percentage from original weight was calculated. The results are based on the average height and weight loss of three pucks tested per product. The higher the percent height/weight loss, the better (quicker) the product sands.

Commercial ITW Evercoat products showed an average height/weight loss in the range of 23-30%. Commercial products of competitive products had an average height/weight loss in the range of 22-32%. The soy 1 sample had an average height/weight loss of 37%, and the soy 2 sample had an average height/weight loss of 72%.

Another advantage of the present invention is that it allows extended working time for the body filler. Frequently, the end-user will reduce the catalyst levels to provide more time for sanding. However, this can create initial and latent performance issues. The two soy formulations, and especially the soy 2 formulation, almost double the working time afforded the technician for performing multiple repairs concurrently. As a result, shop through-put is improved.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A body filler resin composition for a two-part resin system consisting essentially of:
   about 3 to about 60 wt % soy-based unsaturated polyester resin;
   0 to about 57 wt % unsaturated polyester resin, vinyl ester resin, dicyclopentadiene resin, or combinations thereof;
   0 to about 30 wt % reactive monomer, reactive oligomer, reactive bio-derived oils, or combinations thereof;
   0 to about 6 wt % additive;
   about 2 to about 10 wt % talc having a size in the range of about 1 to about 8 microns;
   about 20 to about 50 wt % talc having a size in the range of about 10 to about 20 microns;
   about 2 to about 10 wt % calcium carbonate having a size in the range of about 2 to about 10 microns;
   about 2 to about 8 wt % microspheres; and
   0 to about 10 wt % other fillers.

2. The body filler resin composition of claim 1 wherein the reactive monomer is present and comprises a monomer having vinyl functionality.

3. The body filler resin composition of claim 1 wherein the unsaturated polyester resin, vinyl ester resin, dicyclopentadiene resin, or combinations thereof is present.

4. The body filler resin composition of claim 1 wherein the additive is present and wherein the additive comprises at least one of rheological modifiers, pigment wetting and dispersing agents, antioxidants, inhibitors, pigments, or paraffins.

5. The body filler resin composition of claim 1 consisting essentially of:
   35 to 45 wt % soy-based unsaturated polyester resin;
   0 to about 57 wt % unsaturated polyester resin, vinyl ester resin, dicyclopentadiene resin, or combinations thereof;
   2 to about 30 wt % reactive monomer, reactive oligomer, reactive bio-derived oils, or combinations thereof;
   0 to about 6 wt % additive;
   about 2 to about 10 wt % talc having a size in the range of about 1 to about 8 microns;
   about 20 to about 50 wt % talc having a size in the range of about 10 to about 20 microns;
   about 2 to about 10 wt % calcium carbonate having a size in the range of about 2 to about 10 microns;
   about 2 to about 8 wt % microspheres; and
   0 to about 10 wt % other fillers.

6. The body filler resin composition of claim 1 consisting essentially of:
   about 30 to about 60 wt % soy-based unsaturated polyester resin;
   0 to about 57 wt % unsaturated polyester resin, vinyl ester resin, dicyclopentadiene resin, or combinations thereof;

0 to about 30 wt % reactive monomer, reactive oligomer, reactive bio-derived oils, or combinations thereof;
0 to about 6 wt % additives;
about 2 to about 10 wt % talc having a size in the range of about 1 to about 8 microns;
about 20 to about 50 wt % talc having a size in the range of about 10 to about 20 microns;
about 2 to about 10 wt % calcium carbonate having a size in the range of about 2 to about 10 microns; and
about 2 to about 8 wt % microspheres.

7. A two-part resin system comprising:
a body filler resin composition consisting essentially of:
about 3 to about 60 wt % soy-based unsaturated polyester resin;
0 to about 57 wt % unsaturated polyester resin, vinyl ester resin, dicyclopentadiene resin, or combinations thereof;
0 to about 30 wt % reactive monomer, reactive oligomer, reactive bio-derived oils, or combinations thereof;
0 to about 6 wt % additive;
about 2 to about 10 wt % talc having a size in the range of about 1 to about 8 microns;
about 20 to about 50 wt % talc having a size in the range of about 10 to about 20 microns;
about 2 to about 10 wt % calcium carbonate having a size in the range of about 2 to about 10 microns; and
about 2 to about 8 wt % microspheres; and
0 to about 10 wt % other fillers; and
a hardener composition comprising:
a carrier; and
a catalyst.

8. The two-part resin system of claim 7 wherein the reactive monomer is present and comprises a monomer having vinyl functionality.

9. The two-part resin system of claim 7 wherein the catalyst is a peroxide catalyst.

10. A method of repairing a part comprising:
providing a body filler resin composition consisting essentially of:
about 3 to about 60 wt % soy-based unsaturated polyester resin;
0 to about 57 wt % unsaturated polyester resin, vinyl ester resin, dicyclopentadiene resin, or combinations thereof;
0 to about 30 wt % reactive monomer, reactive oligomer, reactive bio-derived oils, or combinations thereof;
0 to about 6 wt % additive;
about 2 to about 10 wt % talc having a size in the range of about 1 to about 8 microns;
about 20 to about 50 wt % talc having a size in the range of about 10 to about 20 microns;
about 2 to about 10 wt % calcium carbonate having a size in the range of about 2 to about 10 microns; and
about 2 to about 8 wt % microspheres; and
0 to about 10 wt % other fillers;
providing a hardener composition comprising:
a carrier; and
a catalyst;
mixing the body filler resin composition and the hardener composition to form a mixed composition;
applying the mixed composition to the part; and
sanding the mixed composition on the part.

11. The two-part resin system of claim 7 wherein the body filler resin composition consists essentially of:
about 35 to about 45 wt % soy-based unsaturated polyester resin;
0 to about 57 wt % unsaturated polyester resin, vinyl ester resin, dicyclopentadiene resin, or combinations thereof;
2 to about 30 wt % reactive monomer, reactive oligomer, reactive bio-derived oils, or combinations thereof;
0.1 to about 6 wt % additives;
about 2 to about 10 wt % talc having a size in the range of about 1 to about 8 microns;
about 20 to about 50 wt % talc having a size in the range of about 10 to about 20 microns;
about 2 to about 10 wt % calcium carbonate having a size in the range of about 2 to about 10 microns; and
about 2 to about 8 wt % microspheres; and
0 to about 10 wt % other fillers.

12. The method of claim 10 wherein the body filler resin composition consists essentially of:
35 to 45 wt % soy-based unsaturated polyester resin;
0 to about 57 wt % unsaturated polyester resin, vinyl ester resin, dicyclopentadiene resin, or combinations thereof;
2 to about 30 wt % reactive monomer, reactive oligomer, reactive bio-derived oils, or combinations thereof;
0.1 to about 6 wt % additives;
about 2 to about 10 wt % talc having a size in the range of about 1 to about 8 microns;
about 20 to about 50 wt % talc having a size in the range of about 10 to about 20 microns;
about 2 to about 10 wt % calcium carbonate having a size in the range of about 2 to about 10 microns; and
about 2 to about 8 wt % microspheres; and
0 to about 10 wt % other fillers.

13. A body filler resin composition for a two-part resin system consisting essentially of:
about 30 to about 60 wt % soy-based polyester;
0 to about 57 wt % unsaturated polyester resin, vinyl ester resin, dicyclopentadiene resin, or combinations thereof;
0 to about 30 wt % reactive monomer, reactive oligomer, reactive bio-derived oils, or combinations thereof;
0 to about 6 wt % additives;
about 2 to about 10 wt % talc having a size in the range of about 1 to about 8 microns;
about 20 to about 50 wt % talc having a size in the range of about 10 to about 20 microns;
about 2 to about 10 wt % calcium carbonate having a size in the range of about 2 to about 10 microns;
about 2 to about 8 wt % microspheres; and
0 to about 10 wt % other fillers.

14. The method of claim 10 wherein the body filler resin composition consists essentially of:
about 35 to about 45 wt % soy-based unsaturated polyester resin;
0 to about 10 wt % unsaturated polyester resin, vinyl ester resin, dicyclopentadiene resin, or combinations thereof;
2 to about 8 wt % reactive monomer, reactive oligomer, reactive bio-derived oils, or combinations thereof;
0.1 to about 6 wt % additives;
about 2 to about 10 wt % talc having a size in the range of about 1 to about 8 microns;
about 20 to about 50 wt % talc having a size in the range of about 10 to about 20 microns;
about 2 to about 10 wt % calcium carbonate having a size in the range of about 2 to about 10 microns;
about 2 to about 8 wt % microspheres; and
0 to about 10 wt % other fillers.

* * * * *